United States Patent

[11] 3,558,046

| [72] | Inventor | Douglas E. Kelly |
| | | Northfield, Ill. |
| [21] | Appl. No. | 769,531 |
| [22] | Filed | Oct. 22, 1968 |
| [45] | Patented | Jan. 26, 1971 |
| [73] | Assignee | Eaton Yale & Towne Inc. |
| | | a corporation of Ohio |

[54] THERMOSTAT
5 Claims, 2 Drawing Figs.

| [52] | U.S. Cl. | 236/34 |
| [51] | Int. Cl. | F01p 7/16 |
| [50] | Field of Search | 236/34, 34.5, 93, (Fail Safe Digest) |

[56] References Cited
UNITED STATES PATENTS
2,425,439  8/1947  Puster ..................... 236/34.5
3,045,918  7/1962  Woods ..................... 236/34

FOREIGN PATENTS
122,606  5/1931  Austria ..................... 236/F.S.D.

*Primary Examiner*—Edward J. Michael
*Attorney*—Hill, Sherman, Meroni, Gross & Simpson ABSTRACT: A water flow control thermostat having an orifice closing poppet retained in a closed position by spring means acting against a brace. The brace and poppet are attached to the movable arm of a heat-responsive expansible element by means of a fusible low-melting point metal rivet. Movement of the arm in response to temperature increase compresses the spring and opens the poppet. Overheating of the system results in melting of the fusible rivet, releasing the brace and causing the thermostat to fail in a full open position.

PATENTED JAN 26 1971

3,558,046

INVENTOR.
Douglas E. Kelly
BY Hill, Sherman, Meroni, Gross & Simpson
ATTORNEYS

THERMOSTAT

BACKGROUND OF THE INVENTION

1. Field of the Invention

This invention relates to thermostats and more particularly to a fail-safe thermostat designed to fail in a full open position in response to overheating of the system.

2. Prior Art

Heat-responsive valve operators are old in the art, and are used in various applications including automotive applications in connection with water-cooled internal combustion engines. Because such engines operates most efficiently in a given temperature range, it is desirable not to circulate cooling water from the radiator through the engine block prior to the time the engine has sufficiently heated up. To control such flow, thermostat valves are placed in a position to block the flow of cooling fluid. The thermostat valves are usually positioned in a normally closed state, and are responsive to increase in temperature within the engine block to open the valve.

Many prior art thermostats have incorporated spring means to retain the valve in a closed position until the temperature has increased to a desired point. Such valves are subject to a disadvantage in that when the engine overheats it is possible for the valves to fail in a closed or partially open position.

When an engine has its cooling system controlled by a thermostatic valve, it is desirable that if the valve fails during overheating of the engine, it should fail in an open position. This allows continuous circulation of cooling fluid through the overheated engine. Failure of such a valve in a closed position prevents circulation of the cooling fluid which can result in continued overheating and ultimately in engine failure.

SUMMARY OF THE INVENTION

This invention overcomes the deficiencies of the prior art and provides a spring biased normally closed thermostatic valve designed to fail in a fully open position in response to overheating. The thermostat has a central core defining a heat-responsive element which has an arm projecting from one end thereof. The heat-responsive element contains a material which expands a relatively large amount as temperature increases. The expansion of this material forces the arm further out of the one end of the element in response to the temperature of the element.

A coil spring encircles the element and is entrapped between a moving brace and an anchor brace. The anchor brace retains one end of the coil spring and encircles an increased diameter of the element. The moving brace encircles the other end of the coil spring and is attached at its opposite end to a fusible low-melting point metal rivet which is attached to the arm. A poppet is also attached to the rivet.

The assembly is attached to a valve seat by means such as rivets between the vale seat and the anchor brace at one end of the coil spring. With the assembly in its low-temperature state, the poppet closes the valve seat. As the temperature increases, the arm extends from the element moving the poppet away from the valve seat to open flow through the valve seat. At the same time the movable brace, which is attached to the arm by the fusible rivet, moves with the arm, compressing the coil spring. Decreasing the temperature allows the material in the element to return to its normal state and the spring pressure acting against the movable brace forces the arm back into the element and moves the poppet into closing contact with the valve seat.

Should the system in which the thermostat valve is installed overheat, the fusible metal rivet will become soft and the spring action against the movable brace to become detached from the rivet, thereby causing failure to the thermostat valve in its full open position.

It is therefore an object of this invention to provide a fail safe thermostat which will fail in its full open position when subjected to overheating conditions.

It is another and more specific object of this invention to provide a thermostat valve having a fusible low melting point metal portion causing the thermostat to fail in its full open position when subject to overheating.

DESCRIPTION OF THE PREFERRED EMBODIMENT

Figure 1:
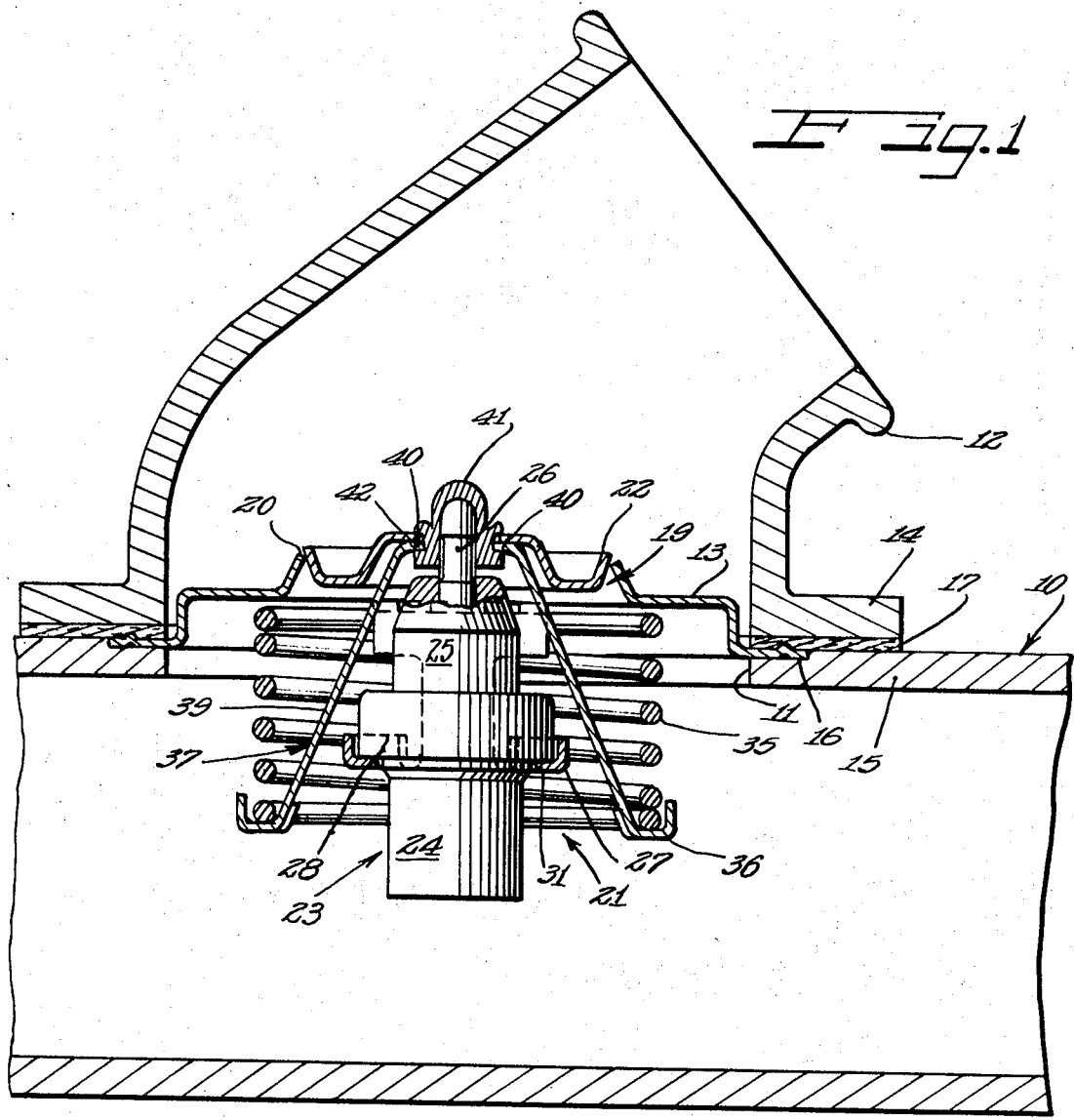
FIG. 1 is a cross-sectional view of an engine head having a thermostat of this invention positioned therein with parts of thermostat in section.
Figure 2:
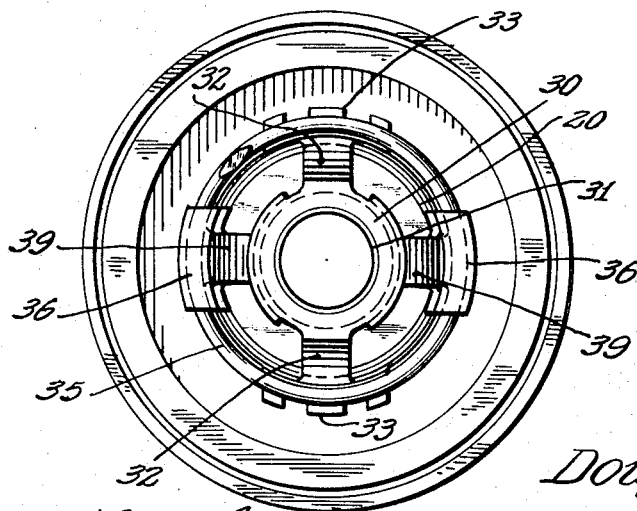
FIG. 2 is a bottom plane view of the thermostate of this invention.

FIG. 1 illustrates a portion of an engine head 10 with an aperture 11 therein communicating to a water outlet 12 which may be of the type connected to a radiator hose.

In normal automotive engines, the opening 11 and the outlet 12 are circular and will be hereinafter described as such, however it is to be understood that the particular configuration involved is optional. A disclike plate 13 is received in the opening 11. The plate 13 is illustrated as being received entrapped between a flange 14 of the outlet 12 and the wall 15 of the housing 10. The plate 13 is seated in a recessed ledge 16 formed in the wall 15 of the head 10. A gasket 17 overlies the periphery of the plate 13 and is positioned between the flange 14 and the wall 15 to ensure a seal between the engine head 10 and the outlet 12. The plate 13 is tiered and has a central opening 19 defining a valve seat 20.

Water which is circulated through the engine block and head 10 passes through the opening 19. This water is used for cooling the engine to prevent it from overheating. However, when the engine is too cold it does not operate efficiently. Circulation of water during such a period restricts the ability of the engine to warm up to its best operating temperature range. It is therefore desirable to limit or prohibit circulation of water at various times in response to the engine temperature.

For this purpose, a temperature responsive valve assembly 21 is positioned adjacent the opening 19 and includes a poppet 22 adapted to mate with the valve seat 20 to selectively close the opening 19.

The thermostat assembly 21 includes a temperature sensitive power element 23 which has a temperature sensing portion 24, a guide portion 25, and an extensible movable arm 26. The temperature sensing portion 24 may be filled with a substance such as a wax which expands in response to increased temperatures. Expansion of the wax in the temperature sensing portion 24 forces the arm 26 to move away from the wax.

The power element 23 is held in place with respect to the plate 13 by mean of an anchor brace 27. The power element 23 has an increased diameter portion 28. The anchor brace 27 has a bottom portion 30 with an annular bore 31 therethrough. The bottom portion of the power element 23 projects through the bore 31 and the increased diameter portion 28 bottoms against the bottom 30 of the anchor plate adjacent the bore 31. A pair of arms 32 extends upwardly and outwardly from the bottom 30 of the anchor plate and terminate adjacent the top of the guide portion 25 of the power element 23 in out-turned flanges 33. The flanges 33 are attached to the plate 13 by means such as welding, riveting, tab and slot, or the like fastening methods.

A coil spring 35 is entrapped between flanges 33 of the anchor brace and the flanges 36 of a moving brace 37. The flanges 36 are located radially outwardly from the power element and are axially spaced from the flanges 33 of the anchor brace. Arms 39 extend from the flanges 36 axially and radially inwardly interior of the coil spring 35 to a point radially spaced from the free end of the moving arm 26. The arms 37 terminate in radially inturned flanges 40.

A fusible metal rivet 41 attaches the flanges 40 to the free end of the moving arm 26.

The poppet 22 has an annular bore 42 in the center thereof which receives the fusible rivet 41 thereby attaching the poppet 22 to the movable arm 26.

The valve assembly 21 is dimensioned so that during unheated periods the poppet 22 will close the vale seat 20. Thereafter as the fluid around the power element 23 increases in temperature, the wax contained therein will expand forcing the movable arm 26 upwardly through the guide portion 25. The upward movement of the arm 26 is transmitted through the fusible metal rivet 41 to the poppet 22 and movable brace 37. This movement lifts the poppet 22 off of the valve seat 20 allowing fluid to pass through the opening 19. At the same time, the anchor brace 37 is drawn upwardly compressing the coil spring 35.

As the fluid surround the power element 23 cools, the pressure of the wax on the movable arm 26 decreases in a known manner and the pressure of the coil spring acting against the ledges 36 of the movable brace 37 will force the brace 37 downwardly, pushing the movable arm 26 back into the guide portion 25 of the power element 23. At the same time, the poppet 22 will move in a direction closing the opening 19.

It can therefore be seen that the opening and closing and extent of opening of the valve is temperature responsive.

If the system in which the valve is inserted become overheated, it is desirable that the valve fail in a fully open position so as to allow continued circulation of coolant fluid. This is accomplished by provision of the fusible metal rivet 41.

The rivet 41 is composed of a metal having a melting point sufficiently low so that it will begin to soften and give when the temperature of the fluid passing through the valve reaches a point signifying overheating of the system. At that point as the metal of the rivet 41 softens, the pressure of the coil spring 35 acting against the movable brace 36 will strip the brace from the rivet 41. This frees the movable arm 26 from the tension force of the coil spring 35 and thereafter, even if the power element 23 should burst, there will be no pressure causing the movable arm 26 to be drawn back into the guide portion 25 thereby closing the opening 19.

It can therefore be seen from the above that my invention provides for a fail-safe thermostat valve which, when subjected to overheating, fails in a full open position.

I claim:

1. A thermostat valve assembly comprising: a temperature-sensitive power element having a moving plunger member projecting therefrom, said element adapted to move said member in response to increased environmental temperatures, a valve closure plate associated with said member adapted to open when said member is moved by said element, spring means adapted to return said member to its unmoved position and close said valve closure plate, and temperature-reactant means connecting said spring means to said member adapted to break said connection in response to environmental overheating to allow the valve assembly to fail in a full open position, said means attached to the end of said member projecting from said element, and support means for attaching said assembly in juxtaposition to a valve seat opening, the closure plate adapted to close the opening.

2. The assembly of claim 1 wherein the temperature reactant means a low-melting point fusible metal rivet cap on said member.

3. A valve assembly comprising: a temperature-responsive power element having a moving plunger member, said member adapted to move outwardly from said element in response to increased temperature sensed by said element, an anchor brace associated with said element adapted to mount said element in juxtaposition to a valve seat opening, a moving brace, a coil spring entrapped between said anchor brace and one end of said moving brace, a fusible low-melting point rivet attached to said member, the other end of said moving brace attached to said rivet and a poppet attached to said member effective to close said opening in low temperature conditions and to move away from said opening in response to movement of said member, the coil spring effective to return said member and poppet to low-temperature position, and said rivet effective to disconnect said moving brace and member in excessive temperature conditions to prevent said coil spring from moving said member and poppet to close said valve.

4. A thermostatic valve assembly comprising: a valve opening defining member having an opening therethrough, a temperature sensitive power element having a moving plunger member projecting therefrom, said element adapted to moves said member in response to environmental temperature increases sensed by said element, means attaching said element to said valve opening defining member, spring means associated with said assembly, a moving brace associated with said assembly, said spring entrapped between a portion of said valve opening defining member and said moving brace, a poppet attached to said plunger member and said moving brace attached to the said plunger member adjacent the free end thereof, said spring means positioned whereby it is tensioned by movement of the said plunger member outwardly from the said element effective to return the said poppet to a closed position in the said opening in response to a decrease in environmental temperature sensed by said element, and the attachment of said moving brace to the said plunger member adjacent the said free end thereof being by means of a low-melting point fusible metal member.

5. The assembly of claim 4 wherein the said metal member comprises a cap received over the free end of said plunger member having a peripheral groove therearound with a portion of the moving brace received in the said groove.